United States Patent [19]

Horne

[11] Patent Number: 4,685,131
[45] Date of Patent: Aug. 4, 1987

[54] PROGRAM BLOCKING METHOD FOR USE IN DIRECT BROADCAST SATELLITE SYSTEM

[75] Inventor: Donald R. Horne, Don Mills, Canada

[73] Assignee: General Instrument Corp., New York, N.Y.

[21] Appl. No.: 710,466

[22] Filed: Mar. 11, 1985

[51] Int. Cl.$^4$ .................. H04N 7/167; H04N 7/10; H04N 1/00
[52] U.S. Cl. ..................................... 380/20; 380/110; 358/86
[58] Field of Search .................. 358/114, 122, 123, 86

[56] References Cited

U.S. PATENT DOCUMENTS

| | | |
|---|---|---|
| 3,899,633 | 8/1975 | Sorenson et al. |
| 4,292,650 | 9/1981 | Hendrickson ........................ 358/114 |
| 4,484,217 | 11/1984 | Block et al. ........................ 358/114 |
| 4,494,142 | 1/1985 | Mistry ................................. 358/114 |
| 4,536,791 | 8/1985 | Campbell et al. ................... 358/122 |

FOREIGN PATENT DOCUMENTS

| | | |
|---|---|---|
| 2725250 | 12/1978 | Fed. Rep. of Germany . |
| 3246146 | 12/1982 | Fed. Rep. of Germany . |
| 1424739 | 8/1973 | United Kingdom . |

Primary Examiner—Stephen C. Buczinski
Assistant Examiner—Melissa Koltak

[57] ABSTRACT

Programming tiers are authorized for viewing on an impulse pay-per-view basis. The system operator controls individual receiver units to block the display of programming on selected tiers because the subscriber finds the content of same objectionable or to prevent members of the household from incurring charges without the subscriber's consent. The broadcast signal includes portions addressable to particular receiver units. These portions include a designation of tiers to be blocked and a command to store same in the unit memory. Upon command to display a program on a selected tier, the memory is accessed and the stored designation compared with the selected tier. Receivers having stored designations corresponding to the selected tier are unable to display the program.

13 Claims, 4 Drawing Figures

PROGRAM BLOCKING METHOD FOR USE IN DIRECT BROADCAST SATELLITE SYSTEM

The present invention relates to direct broadcast satellite systems and, more particularly, to a program blocking method for use with such systems in which the blocking of the display of selected programming at individual receiver units is controllable by the system operator.

The present invention has general applicability to television distribution systems, regardless of the means employed for signal distribution. Thus, it may be used on cable, microwave, or satellite distribution systems. However, it is particularly suitable for use on direct broadcast satellite systems and, for that reason, the method is described as it would be applied to such systems.

The availability of small, low-cost television receive-only terminals in recent years has resulted in an increasing demand for direct broadcast satellite services. Such services include Pay-TV, tele-conferencing, teleseminar, private broadcast networks, and the like.

Unlike land lines and terrestrial microwave links, satellite transmissions lack privacy. Such transmissions can be received by any TV receive-only terminal whose antenna is situated to receive the satellite signals. Accordingly, secure transmission of video and audio programming and data signals is required to provide the privacy essential to many applications.

A simple example of a direct broadcast satellite network in which security is required is one which broadcasts television signals to paying subscribers. Since any receiver having an antenna in the broadcast area can receive the satellite signals, it is necessary that the signals be coded in a way which can be decoded only by the subscriber's receivers. Certain subscribers may have paid for certain programs or program groups, whereas other may have paid for other programs or program groups. The signals must then be further encoded such that subscribers who have paid for particular programs or groups of programs can receive same, while other subscribers cannot.

In addition, it may be desirable to design the system such that a particular subscriber can preview a program not within the subscription and then decide whether he or she wishes to watch the program and, hence, pay for the priviledge. In such an impulse pay-per-view system, the decision of the subscriber must be recorded and communicated to a billing facility for appropriate billing. In such instances, the control signals to the subscriber's receiver instructing the receiver how to communicate with the billing office must be secure in order to eliminate the possibilities of theft of the service.

Usually, all programs not paid for by subscription are available on a pay-per-view basis. However, certain programs available on an impulse pay-per-view basis may be considered by the subscriber as inappropriate for viewing by the household or certain members thereof. Such programs may, for instance, include violet or sexually explicit movies or the like. It is therefore desirable that the satellite system incorporate a means for blocking the display of such programs by the subscriber's receiver unit.

In the direct broadcast satellite system in which the present invention is employed, this control function can be exercised in two different modes of operation. Program blocking may be controlled remotely be the system operator or it may be controlled locally by the subscriber. The remote modes of operation will prevent the display of objectionable programming even if the receiver unit is instructed to display the program as an impulse pay-per-view item by the entry in the receiver unit of a subscriber passcode normally required to authorize viewing and billing.

Two parental control lists can be entered into a memory at the receiver unit. One list is entered and controlled locally by the subscriber. This is referred to as the Parental Control list. When a program on the Parental Control list is selected for viewing, the receiver will display an indication that it is on the Parental Control list. By entering the appropriate code into the receiver, the subscriber can override the Parental Control function and permit display of the program.

The other list is controlled exclusively by the system operator and is referred to as the blocking list. Control over the blocking list permits the system operator, from the transmission end, to block the display of certain programs even if they are selected for display on an impulse pay-per-view basis. The system operator can alter the blocking list as needed on a real time basis. The subscriber cannot override the blocking of programs on the blocking list without action on the part of the system operator.

The blocking list may contain programming which the subscriber has notified the system operator is considered objectionable, for example, because it contains unsuitable content. The subscriber does not wish the members of his/her household to view such programming. This list may also contain programming which was previously selected for an impulse pay-per-view transaction by a member of the household without the subscriber's permission or knowledge and for which the subscriber has previously refused to pay. Subsequent blocking of such programming eliminates future payment disputes. The system operator may also block all impulse pay-per-view transactions for failure of the subscriber to pay prior bills.

There are preferably 32 levels of subscription catagories called tiers provided in the distributed composite television signal. Each tier carriers a different variety of programming. A particular program may suit several tiers, much like a library index card listing for a book having several possible topics of interest.

The subscriber communicates with the system operator a choice of which tiers to pay for by subscription. All other programs are normally received on an impulse pay-per-view basis. The system operator may choose to block entirely the viewing of any tier by a particular subscriber. This may be done at the subscriber's request, for example, because certain tiers contain objectionable programming such as violent or sexually explicit movies, or because someone has been viewing programs on a particular tier by means of impulse pay-per-view transactions without the knowledge or permission of the subscriber. Under such circumstances, or for a variety of other reasons, the subscriber may refuse to pay claiming that a particular program was never viewed. The system operator may prefer to block all programs on that particular tier in the future until such time as the subscriber communicates other instructions directly to the system operator.

An authorization list is communicated to each receiver unit and stored therein. Program tiers not on this authorization list may be viewed without extra charge. Other program tiers are viewed on an impulse pay-perview basis. Thus, any program tier which do not matche a tier in the authorization list is eligible for an impulse pay-per-view transaction. The subscriber will be advised of same by the appropriate indication on the display and the subscriber may proceed to enter the necessary pass-code in the receiver unit for the impulse pay-per-view transaction. However, if the program tier matches a tier designated on the blocking list controlled by the system operator, the program cannot be decoded or displayed, even on an impulse pay-per-view basis.

It is, therefore, a prime object of the present invention to provide a program block method for use in a direct broadcast satellite system wherein the program blocking function is under the control of the system operator.

It is another object of the present invention to provide a program blocking method for use in a direct broadcast satellite system wherein each receiver unit is provided with a blocking memory for storing information provided by the system operator.

It is another object of the present invention to provide a program blocking method for use in a direct broadcast satellite system wherein the composite television signals distributed contain the information to control the individual blocking memories of the receiver units.

It is another object of the present invention to provide a program blocking method for use in a direct broadcast satellite system wherein addressable portions of a data stream contain information necessary to set and reset the blocking memories of the various receiver units.

In accordance with the present invention, a method of preventing the display of selected programs is provided for use in a television distribution system. The system is of the type including a transmission station and a plurality of receiver units. Each receiver unit is capable of displaying a program selected by the viewer upon command and includes a memory. The method comprises the steps of generating a broadcast signal including a plurality of tiers of programs. The broadcast signal also includes portions which are addressable to particular receiver units. The addressable portions include a designation corresponding to one or more selected tiers of programming and a command to the addressed receiver to store the designation in its memory. Each addressed receiver unit receives the broadcast signal. It stores the designation contained therein in its memory. Upon command from the user to display a program on a given tier, the memory is accessed and the given tier is compared with the stored designation. Any receiver having a stored designation corresponding to the given tiers is unable to display the program.

The designation preferably comprises a blocking bit map. The memory preferably comprises a blocking bit map memory.

The programs are preferably encoded prior to distribution. The method further comprises the step of not decoding the encoded program if the memory designation corresponding to the given tier is present.

The system has pay-per-view capability. The receiver unit is manipulated to authorize the display of a program on the given tier.

The addressable portions are generated by the system operator at the transmission end. The step of generating the addressable portions includes the step of altering the designation therein. Alteration of the designation in the addressable portion is performed on a real time basis.

The method further comprises the step of authorizing each receiver unit to display one or more programming tiers on a subscription basis. The addressable portions comprises a second designation corresponding to one or more tiers. Each addressed receiver stores the second designation in its memory. The given tier is compared with the stored second designation. Displaying of the program is possible only if the stored second designation corresponds to the given tier. If the given tier fails to correspond with second desigantion, then viewing is possible on a pay-per-view basis.

The second designation preferably comprises an authorization bit map. The memory preferably comprises an authorization bit map memory.

To these and to such other objects which may hereinafter appear, the present invention relates to a program blocking method for use in a direct broadcast satellite system, as set forth in detail in the following specification and recited in the annexed claims, taken together with the accompanying drawings wherein like numerals refer to like parts, and in which:

The details of the direct broadcast satellite network in which the method of the present invention is employed, including an explanation of the transmission end equipment, the terminal end equipment, and the signal transmission system employed for communications between the two are set forth in co-pending U.S. Pat. No. 4,599,647 issued July 8, 1986 in the names of Ashok George and John Jeffers, entitled "Receiver With Interface For Interaction With Controller-Decoder" and in co-pending U.S. patent application Ser. No. 729,290 filed May 1, 1985 in the names of Joseph Glaab, Donald Horne, John Jeffers, and Wayne Mundy, entitled "Direct Broadcast Satellite Signal Transmission System".

An explanation of the basic cryptographic method used in the direct broadcast satellite network disclosed above can be obtained from co-pending U.S. patent application Ser. No. 665,114 filed Oct. 26, 1984 in the name of Donald Horne, and entitled "Cryptographic System For Direct Broadcast Satellite Network." Certain improvements in the cryptographic system used in the direct broadcast satellite network can be obtained from co-pending U.S. patent application Ser. No. 710,385 filed Mar. 11, 1985 in the names of Donald Horne and John Jeffers, entitled "Cryptographic Ssytem Using interchangeable keyblocks and Selectable Key Fragments."

The direct broadcast satellite network of the present invention is designed to supply television programming to a large number of subscriber receiver units distributed in various geographic areas. Each geographic area may have a large number of subscriber receiver units contained therein.

Each of the subscriber units is supplied, via satellite, with a number of different programming tiers. Each subscriber, upon entering the network, obtains a TV receive-only unit which can be interfaced with an addressable controller-decoder supplied by the system operator.

Each subscriber chooses one or more of the programming tiers to be received on a subscription basis. The subscriber pays the system operator a periodic fee, for example monthly, which entitles him/her to view the programs on the tiers he/she has selected and paid for. Other tiers of programming can be paid for on an impulse pay-per-view basis. Programs eligible for viewing on an impulse pay-per-view basis are previewable by the subscriber by permitting the subscriber to view the beginning of the program, for example, the first five minutes thereof, after which the subscriber must decide whether to pay for the privilege of viewing the remainder of the program.

In order to view a program eligible for an impulse pay-per-view transaction, the subscriber enters a secret passcode on a keyboard associated with the receiver unit. The addressable controller-decoder connected to the receiver unit will enter certain information into a memory relating to the identification number of the program being viewed, the time and date of the viewing, and the cost which the subscriber will have to pay for the privilege of viewing the program.

Periodically, the addressable controller-decoder will receive instructions from the system operator to forward the accumulated data relating to the previous impulse pay-per-view transactions and provide same to the system operator for billing purposes. This can be done in one of many ways. Two of the preferred ways are by telephone and by mial. If the addressable controller-decoder has telephone communications capability, that is, provided with a modem connected to a telephone line, and the necessary circuitry to operate the modem, the controllable addressable decoder will call a computer located at the transmission end and, after the appropriate identification procedure, will transfer the information concerning the impulse pay-per-view transactions stored in the addressable controller-decoder memory to the computer at the transmission end. That computer will then periodically generate a bill which will be delivered to the subscriber.

If the addressable controller-decoder does not have telephone communications capability, a credit card type device can be utilized for billing purposes. The credit card type device is essentially a memory on a card hwich is inserted into a slot provided on the addressable controller-decoder. Upon receiving the appropriate commands from the transmission end, the addressable controller-decoder will transfer its stored information concerning the impulse pay-per-view transactions onto the card memory. The subscriber will then mail the card memory to the system operator who will then access the card memory to ascertain the impulse pay-per-view transactions and provide the subscriber with a bill in accordance therewith.

Figure 1:
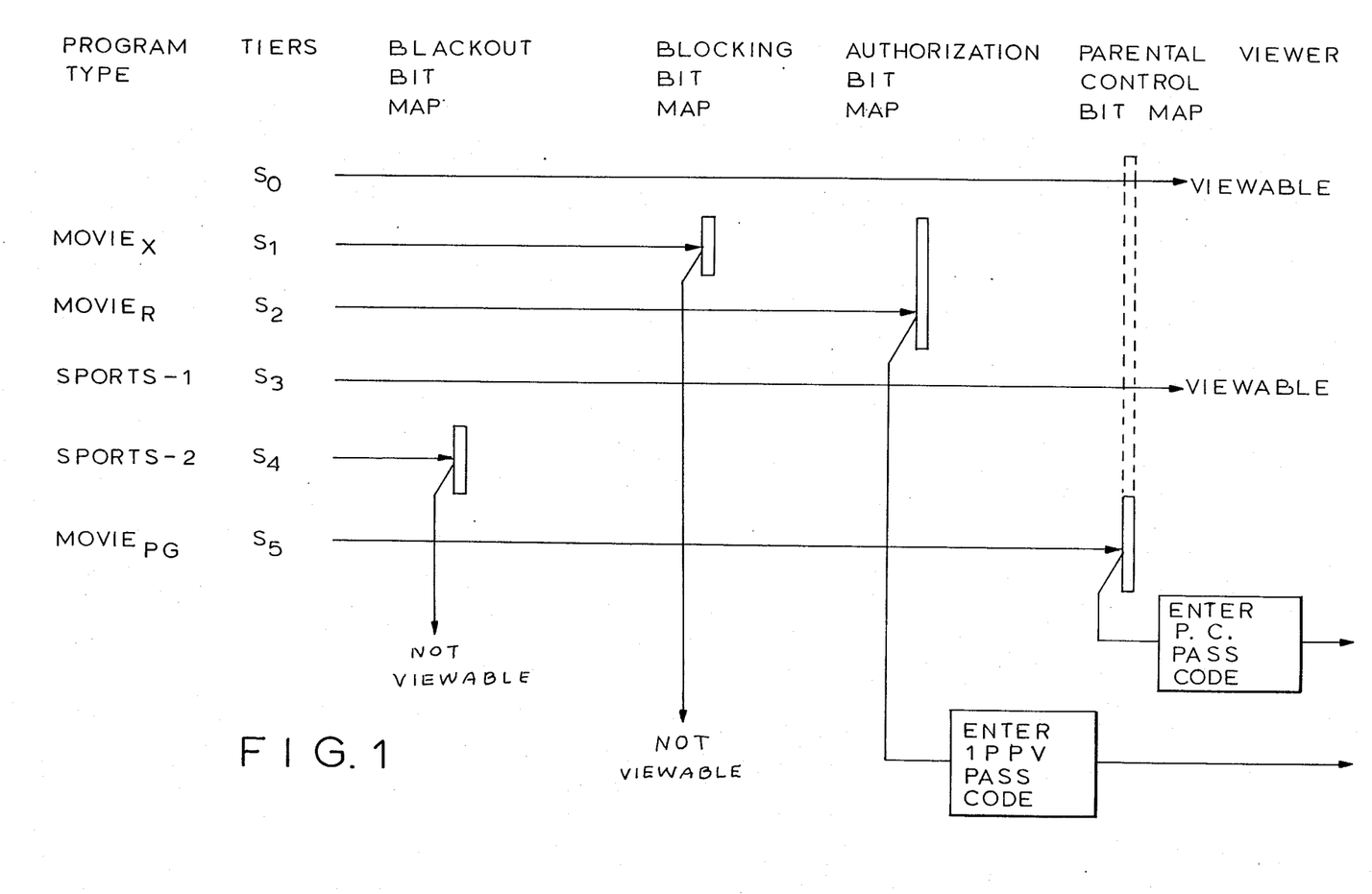
FIG. 1 is a diagram schematically representing the stored designation memory, including the authorization bit map, the local parental control bit map, the blocking bit map controlled by the system operator, and the blackout bit map also controlled by the system operator, or a typical subcriber receiver unit of the present invention.
Figure 2:
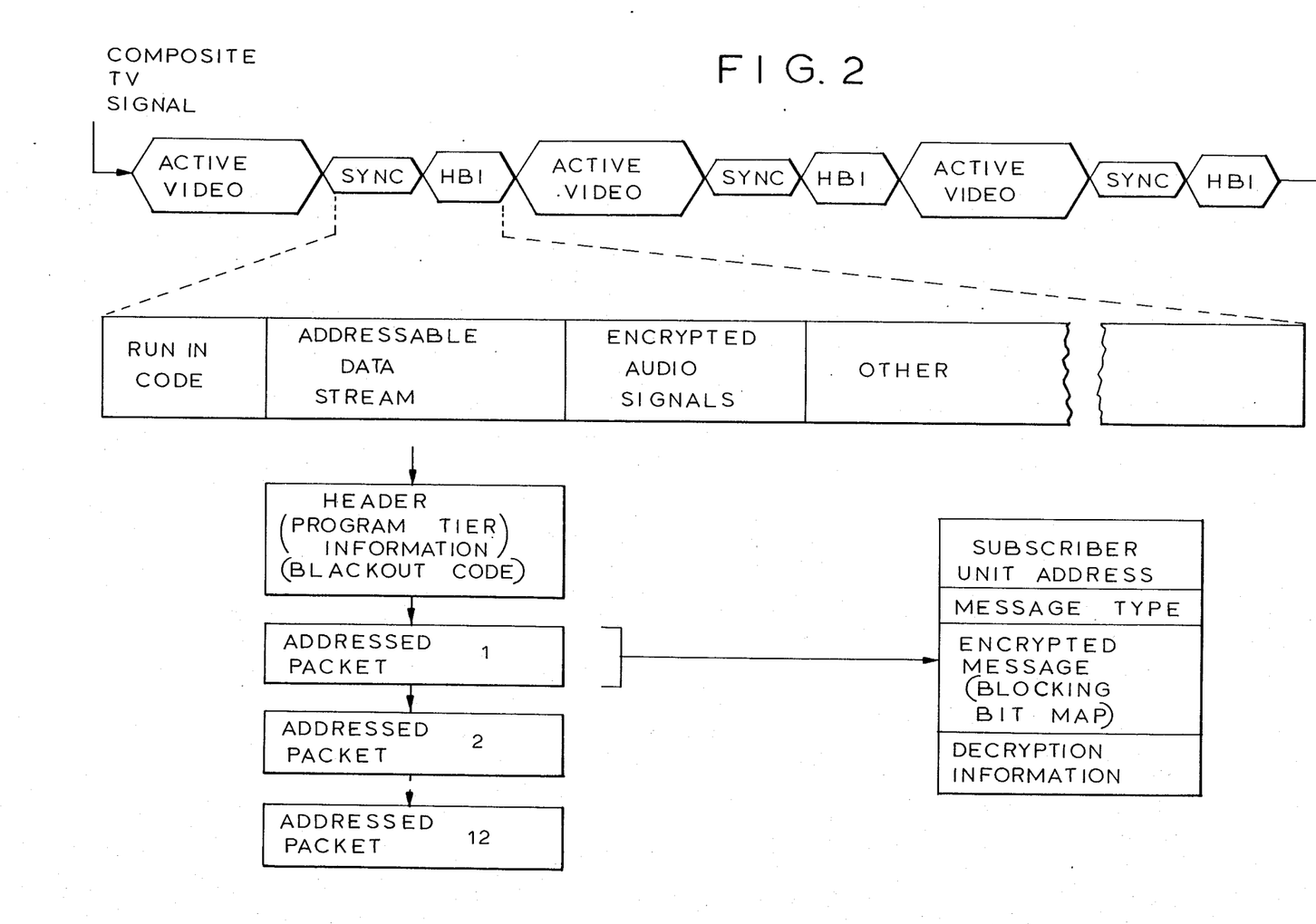
FIG. 2 is a flow chart of the operations which permit a subscriber receiver unit to decide whether a particular program can be decoded and displayed.

FIG. 1 graphically depicts the designation memory in which the authorization bit map, blocking bit map, parental control bit map and blackout bit map are utilized within the addressable controller-decoder. While the electronic storage facilities may be considered to as separate "memories", it should be understood that these "memories" may, in reality, be different locations in the same memory circuit.

Only 6 tiers of programming $S_0 \ldots S_5$ are illustrated, but it is understood that many more tiers of programming can be utilized. Programming tiers $S_0$, $S_3$, $S_4$ and $S_5$ are programming tiers which have been paid for by subscription and contain, for example, commercial programming which can be viewed without further action on the part of the subscriber.

Programming on tiers $S_1$, and $S_2$, not being within the subscription, are available for viewing on an impulse pay-per-view basis, as indicated by the authorization bit map. Programming tiers $S_2$ and $S_5$, for example, contain "R" rated and "PG" rated movies thereon, respectively. Both programming tiers $S_1$ and $S_2$ are eligible for impulse pay-per-view transactions as the addressable controller-decoder has previously received instructions to set the authorization bit map memory to authorize the viewing of these tiers on this basis. However, for example, the subscriber does not wish to have certain members of the household to view the "X" rated movies on programming tier $S_1$. This has been previously communicated to the system operator who has then provided the subscriber's addressable controller-decoder with particular commands such that the blocking bit map contained in the subscriber's addressable controller-decoder memory has been set to block the display of programming tier $S_1$, even if the appropriate passcode is entered into the controller which would normally permit the subscriber unit to display the program and charge the subscriber for the priviledge.

Programming tiers $S_3$ and $S_4$ contain sports programs thereon. Programming tier $S_3$ and $S_4$ like tier $S_0$, is part of the subscription and, hence, need not be authorized for impulse pay-per-view transactions. The program on $S_3$ is not blocked or blacked out and, therefore, can be viewed. However, the program on tier $S_4$ has been blacked out of the geographic area in which the subscriber unit is situated, as indicated by the blackout bit map. Accordingly, the addressable controller-decoder will not permit the programming on tier $S_4$ to be displayed.

This is common with certain sporting events which are broadcast in areas other than the locality in which the event is taking place. In order to maintain high attendance at the arena where the sporting event is occurring, the program may be sold for distribution with the restriction that it not be distributed in the arena locality. Accordingly, the system provides a mechanism whereby all receiver units located in a designated geographic area can be simultaneously prevented from displaying a program. That is, the program is blacked out in that geographic area.

For more information concerning the details of how this is accomplished, the reader is referred to co-pending U.S. patent application Ser. No. 672,925 filed Nov. 19, 1984 in the names of Wayne Mundy, John Jeffers, and Stephen Knight, entitled "Geographic Blackout Method for Direct Broadcast Satellite System."

The programming on tier $S_5$, like the programming on tiers $S_0$ and $S_3$ is eligible for viewing pay-per-view transactions since this programming has not been blocked by the system operator and has not been blacked out. Normally, it could be viewed. However, in this case, programming on tier $S_5$ is designated in the locally controlled parental control bit map as being a program tier which cannot be viewed unless the parental control passcode is entered into the keyboard of the receier unit. When and if this is done, the programming on tier $S_5$ becomes eligible.

Control data, including information for storage in the authorization bit map, blocking bit map, and blackout bit map is distributed to the subscriber units through a data stream which is situated in consecutive horizontal blanking intervals within the composite television broadcast signal.

In general, the data stream includes a header packet which contains a group address, certain program related information including the tier upon which a particular program is broadcast, and certain impulse pay-per-view information such as an identification number relating to the particular program eligible for impulse pay-per-view transactions and the cost of viewing same. This type of information is generally applicable to all receiving units in the addressed group.

The data stream also includes a plurality of addressable packets containing encrypted messages applicable to the control of particular subscriber units within the addressed group. Each subscriber unit has an individual address number. An addressable packet is addressed to the particular subscriber unit by including therein the subscriber unit's individual address. Only the subscriber unit with that individual address number can receive and decoder the message in that addressed packet.

The addressed packet may contain a selected one of several different messages, along with the information necessary for the particular address subscriber unit to decode the message. For example, a particular message may cause the addressed subscriber unit to load authorization bits into its authorization bit map memory. Another message may cause an addressed receiving unit to load blocking bits into its blocking bit map memory. A third message may cause an addressed receiving unit to load blackout bits into its blackout map.

Figure 3:
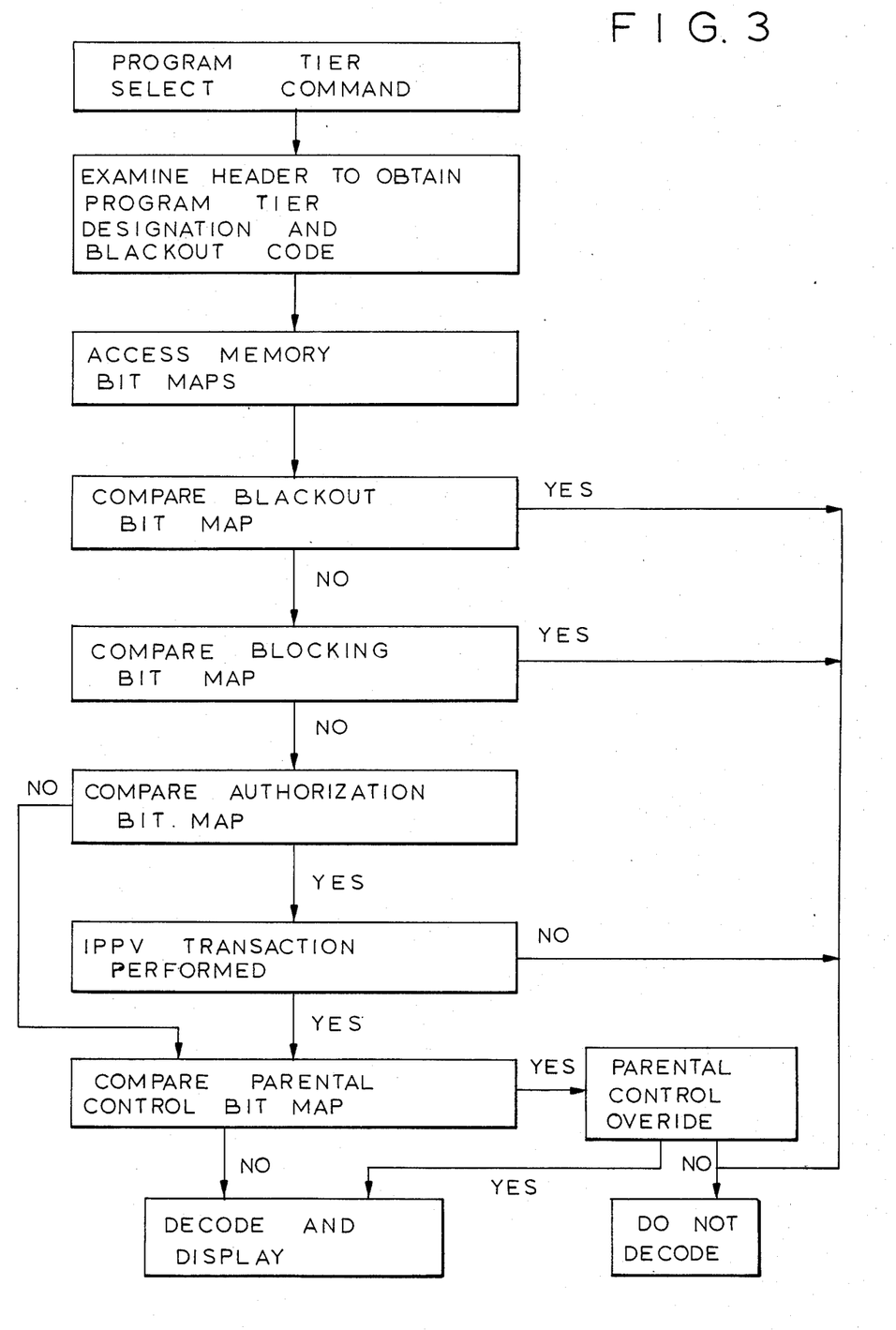
FIG. 3 is a schematic diagram illustrating the composite television broadcast signal distributed through the direct broadcast satellite system in which the present invention is utilized.

FIG. 3 schematically represents the type of composite TV signal distributed by the direction broadcast satellite network. This signal comprises a plurality of active video portions, sync portions, and horizontal blanking interval portions. A data stream, including digitized audio signals and control data, is inserted into consecutive horizontal blanking intervals of the composite television signal.

The data stream includes a run-in code portion, an addressable data stream portion, an encrypted audio signal portion, and audio code portion indicating whether the audio channels being broadcast are stereo or bilingual a video inversion code required to descramble the video signals, and other information portions.

The addressable data stream portion includes a header packet and a plurality of addressable packets. Information relating to the control of specific receiver units is contained in addressable packets including the unique address number of the particular subscriber receiving unit.

Each of the addressable packets includes an address portion, an indication of the type of message included in the packet, and an encrypted message. The packet also includes information which will enable the addressed receiving unit only to decode the message.

Messages of various types, containing a variety of different kinds of control data, can be distributed in this fashion. For purposes of this application, it is sufficient to understand that one type of message may include a command to the addressed subscriber unit to load a particular bit map into a particular memory location. The type of message indicated defines a command for the receiving unit, that is, how the information in the message is to be processed by the receiving unit.

A typical message is illustrated as addressable packet 1. This packet includes the subscriber unit address code for one specific unit, an indication of the message type (i.e., command to set block bit map memory), the message (the blocking bit map to be loaded into the memory), and the necessary information for the addressed unit to decrypt the message.

Upon receipt of this packet, the receiving unit compares the address code portion with the address code in its memory. If the address codes match, the message decryption information will be used in conjunction with certain information stored in the unit to decrypt the message. The information in the message will then be processed by the receiving unit in accordance with the message type. If the message type indicates a command to set the blocking bit map, the receiving unit will use the blocking bit map in the message to set the blocking bit map.

Information for setting the authorization bit map is transmitted in the same manner. A different message type will be used, this message type indicating to the addressable controller-decoder that it is being instructed to set its authorization bit map. The message will include the authorization bit map to be loaded into the authorization bit map.

Blackout bit map memories are set in a similar manner, except that blocking bit map is set globally, that is, for a large number of receiver units at one time, by addressing groups of receiver units within a geographic area to be blacked out and simultaneously loading the necessary blackout bit map information.

In the manner set forth above, the authorization bit map, the blocking bit map, and the blackout code bit map for each individual receiving unit is set by the system operator at the transmission end through the data stream. The parental control map is loaded locally in accordance with commands of the subscriber entered into the keyboard of the receiver.

Information in the bit map which are set by the system operator can be altered on a real time basis by the system operator by simply altering the information contained in a message which is addressed to a particular subscriber unit and distributed over the data stream portion of the composite television signal. This provides the system operator with a great deal of control over the individual receiving units and permits her/him to provide customized service to the individual subscribers.

As illustrated in FIG. 3, when a subscriber enters a particular tier number in the keyboard associated with her/his receiver indicating that she/he wishes to view a program on that tier, the receiver will examine the header packet broadcast in the composite television broadcast signal to obtain the program tier designation and blackout code of the selected program. The receiving unit will then access its maps which will have locations therein corresponding to the authorization bit map, blocking bit map, and blackout bit map, previously entered therein by the system operator and the parental control bit map entered therein by the subscriber.

The receiving unit will compare the blackout bit map with the blackout code of the header portion. If the blackout bit map has a designation corresponding to the transmitted blackout code, the program is blacked out and will not be decoded for display. Otherwise, the receiver compares the program tier designation with the designations in the blocking bit map. If the program tier designation corresponds to a designation in the blocking bit map, the program can not be displayed. The authorizatin bit map is the next to be considered. If the selected tier appear in the authorization bit map, this program has been paid for by subscription and can be decoded and displayed. Otherwise, the program is eligible for impulse pay-per-view transactions. If the selected tier does not appear in the authorization bit map, this program may be viewed on an impulse pay-per-view basis by entering the necessary passcode.

The receiving unit next compares the transmitted parental guidance level with the parental control bit map. If the program is at a parental guidance level lower than the subscriber's local parental control level the program will be viewed. If the program is higher than the local level then viewing will occurr only if the proper parental passcode is entered at the receiving unit by the viewer.

Figure 4:
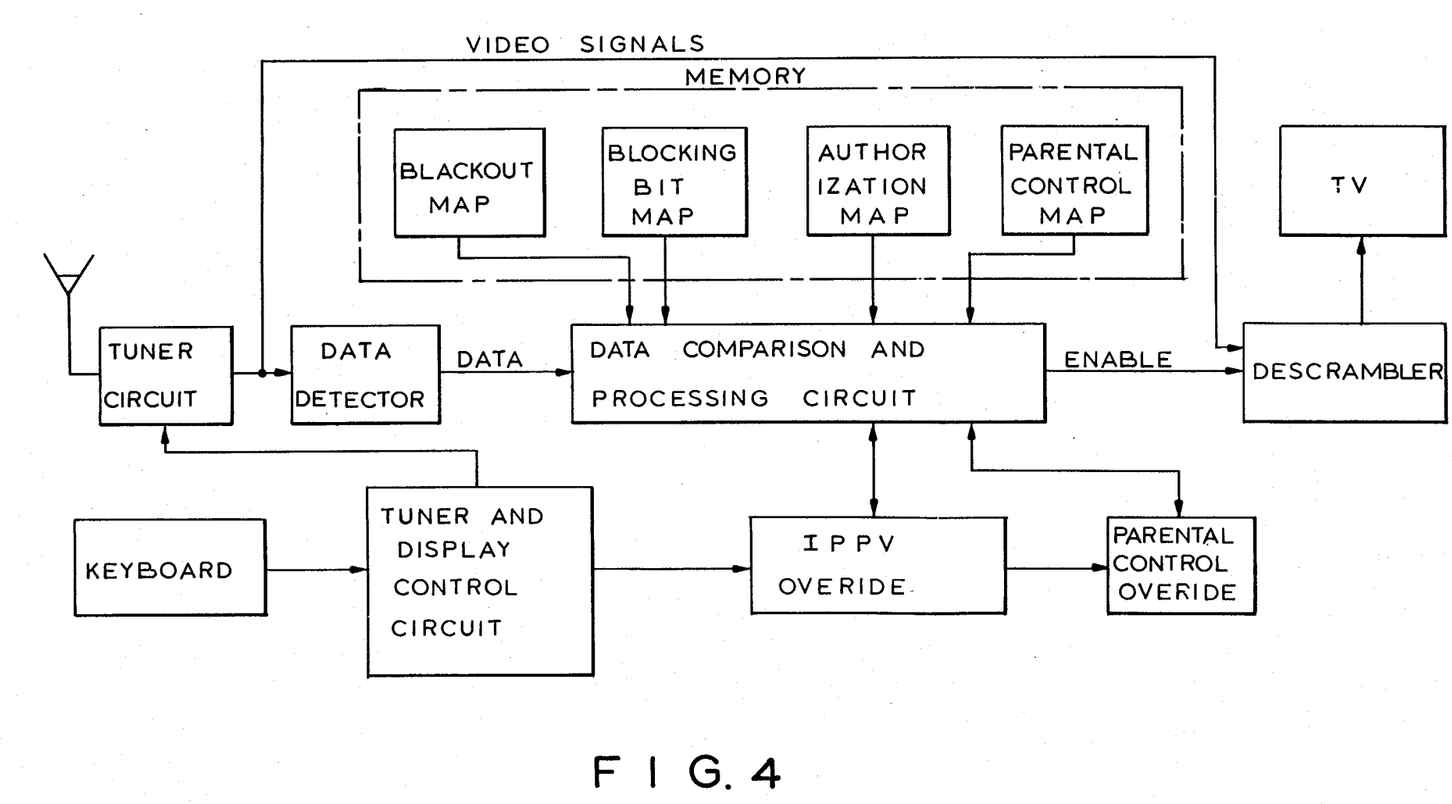
FIG. 4 is a block diagram illustrating selected components of a typical subscriber receiver unit of the present invention.

FIG. 4 is a block diagram of a typical receiving unit of the present invention. The receiver includes a keyboard into which the subscriber enters a number associated with a tier of programming which is to be displayed. The broadcast signal is received at the tuner circuit and the appropriate signal frequency chosen. The header packet broadcast in the composite television broadcast signal of the selected frequency is examined to obtain the program tier designation and blackout code.

The various maps in the memory will then be accessed in turn. The program tier designation is first compared with the contents of the blackout map. If the program is not to be blacked out, the program tier designation is then compared with the contents of the blocking bit map. If the program is not to be blocked but, the program tier designation is compared with the contents of the authorization bit map. If the program has been previously authorized, then the program tier designation is compared with the parental control bit map. If the parental control bit map does not prevent display, an enabling signal is provided to the descrambler which then descrambles the program information and transfer same to the television to be displayed.

If the program tier is not previously authorized, the subscriber may enter an impulse pay-per-view override pass code into the keyboard such that the program can be viewed. Similarly, if the program is blocked because of the parental control bit map, a similar override signal can be entered at the keyboard.

It will now be appreciated that the present invention relates to a program blocking method for use in a direct broadcast satellite system in which the system operator has control over program blocking at each of the individual receiving units. This control is provided by loading the memories of the respective receiving units which a blocking bit map designating particular tiers of programming which are to be blocked. Each program is transmitted with a program tier designation. Upon receipt of the program information the receiving unit compares the program tier designation with the designations in the stored blocking bit mpa. If matching designations are present, the program cannot be decoded for display.

Information for the control of the blocking bit map memory is transmitted by means of a data stream which forms a portion of the composite television broadcast signal. The data stream comprises individually addressable packets containing information which can be altered on a real time basis. Thus, the system operator can exercise control over the various receiving units on a real time basis.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims.

I claim:

1. A method for preventing the display of selected programs by particular receiving units for use in an impulse pay-per-view television signal distribution system of the type comprising a transmission station and a plurality of receiving units, each receiving unit being capable of displaying one or more programs selected by the user upon manipulation of input means and including an authorization memory containing information as to programs previously authorized for display and a blocking memory containing previously provided information as to programs to be blocked from display, the method comprising the steps of: generating a broadcast signal including a plurality of programs and a program designation associated with each of the programs, the receiving unit receiving the broadcast signal and, upon manipulation by the user of the input means to select a program for display, accessing the blocking memory and comparing the designation associated with the selected program with the contents thereof to determine if the selected program is to be blocked from display, preventing the display of the selected program if the program is to be blocked from display; if the selected program is not to be blocked, accessing the authorization memory and comparing the designation associated with the selected program with the contents of the authorization memory to determine whether the selected program has been previously authorized for display, and preventing the display thereof if the selected program is not previously authorized for display; and, if not previously authorized for display, displaying the selected program if it is not to be blocked, upon further manipulation of the input means.

2. The method of claim 1, wherein the designation comprises a bit map and the block memory comprises a bit map memory.

3. The method of claim 1, wherein the broadcast signals are encoded and wherein the step of preventing the display of the selected program comprises the step of preventing the decoding of the broadcast signal.

4. The method of claim 1, wherein the step of displaying the selected program upon further manipulation of the input means comprises the step of entering an override command into the input means.

5. The method of claim 1, wherein the broadcast signal comprises a portion addressable to a particular receiving unit and wherein the step of generating the broadcast signal comprises the steps of generating a portion addressed to a particular receiving unit including blocking information and the command to store the blocking information in the blocking memory and further comprising the step of storing the blocking information in the blocking memory upon receipt of the addressed portion by the particular receiving unit.

6. The method of claim 1, wherein the authorization memory comprises a bit map memory.

7. The method of claim 1, wherein the step of displaying the selected program upon further manipulation of the input means comprises the step of entering a pass code into the input means.

8. A method for preventing the display of a selected tier of programming by particular receiving units for use in an impulse pay-per-view television distribution system of the type comprising a transmission station and a plurality of receiving units, each receiving unit being capable of displaying one or more programs selected by the user and including an authorization memory containing information as to one or more tiers of programs previously authorized for display and a blocking memory containing previously provided information as to one or more tiers of programs to be blocked for display, the method comprising the steps of: generating a broadcast signal including a plurality of programs and a tier designation associated with each of the programs, the receiving unit receiving the broadcast signal and, upon manipulation by the user to select for display a program on a given tier, accessing the blocking memory and comparing the designation associated with the given tier with the contents thereof to determine if the given tier is to be blocked, preventing the display of the selected program if the given tier is to be blocked, if the given tier is not to be blocked, accessing the authorization memory and comparing the designation associated with the given tier with the contents thereof to determine whether the given tier has been previously authorized for display, preventing the display of the program if the given tier has not been previously authorized for display and, if the given tier is not previously authorized for display, displaying the selected program if the given tier is not blocked, upon further manipulation of the receiving unit by the user.

9. A receiving unit for use in a distribution system for a television signal of the type including a plurality of programs and a designation associated with each program, the receiving unit having impulse pay-per-view capability and comprising: input means for receiving a program select command from the user, a blocking memory containing previously provided information as to programs to be blocked from display; means for accessing the blocking memory and for comparing the contents thereof with the designation associated with the program selected in accordance with a program select command to determine if the selected program is to be blocked; means for preventing the display of the selected program if the program is to be blocked; an authorization memory containing information as to programs previously authorized for display; means, actuatable if the selected program is not to be blocked, for accessing said authorization memory and for comparing the contents thereof with the designation for the selected program, to determine if the selected program has been previously authorized for display, and override means, actuatable if the selected program has not been previously authorized for display and is not to be blocked, for displaying the selected program.

10. The receiving unit of claim 9, wherein each receiving unit has an address and the broadcast signal contains addressable portions and wherein one of the addressable portions comprises blocking information and a command for the addressed receiving unit to store said blocking information in its blocking memory and further comprising means for storing the blocking information in said blocking memory upon receipt of an addressable portion containing the address of the receiving unit.

11. The receiving unit of claim 9, wherein the blocking memory comprises a bit map memory and the program designation comprises a bit map.

12. A receiving unit for use in a distribution system for a television signal of the type including one or more tiers of programming and a designation associated with each tier, the receiving unit having impulse pay-per-view capability and comprising: input means for receiving a program select command from the user; a blocking memory containing previously provided information as to one or more tiers of programs to be blocked from display; means for accessing the blocking memory and for comparing the contents thereof with the designation associated with the tier of the selected program to determine if the program is to be blocked; means for preventing the display of the selected program if the tier of the selected program is to be blocked; an authorization memory containing information as to tiers of programs previously authorized for display; means, actuatable if the tier of the selected program is not to be blocked, for accessing said authorization memory and for comparing the contents thereof with the designation for the tier of the selected program, to determine if the tier of the selected program has been previously authorized for display, override means, actuatable if the tier of the selected program has not been previously authorized for display and is not to be blocked, for displaying the selected program only upon receiving the appropriate override command.

13. The receiving unit of claim 12, wherein each recieving unit has an address and the broadcast signal contains adressable portions and wherein one of the addressable portions comprises blocking information and a command for an addressed receiving unit to store said blocking information in its blocking memory and further comprising means for storing the blocking information in said blocking memory upon receipt of an addressable portion containing the address of the receiving unit.

* * * * *